US011434036B2

(12) United States Patent
Baumann et al.

(10) Patent No.: US 11,434,036 B2
(45) Date of Patent: Sep. 6, 2022

(54) LABEL APPLICATION SYSTEM

(71) Applicant: Dover Europe Sarl, Vernier (CH)

(72) Inventors: Michael Baumann, Zurich (CH); Gerd Buehler, Volketswil (CH)

(73) Assignee: Dover Europe Sàrl, Vernier (CH)

( * ) Notice: Subject to any disclaimer, the term of this patent is extended or adjusted under 35 U.S.C. 154(b) by 0 days.

(21) Appl. No.: 17/157,814

(22) Filed: Jan. 25, 2021

(65) Prior Publication Data

US 2021/0229852 A1 Jul. 29, 2021

(30) Foreign Application Priority Data

Jan. 27, 2020 (EP) .................................... 20153937

(51) Int. Cl.
*B32B 41/00* (2006.01)
*B65C 9/40* (2006.01)
*B65C 1/02* (2006.01)

(52) U.S. Cl.
CPC ................ *B65C 9/40* (2013.01); *B65C 1/021* (2013.01)

(58) Field of Classification Search
CPC .............. B65C 9/40; B65C 1/021; B65C 9/28
USPC .................... 156/60, 64, 350, 351, 378, 379
See application file for complete search history.

(56) References Cited

U.S. PATENT DOCUMENTS 4,844,771 A 7/1989 Crankshaw et al.
5,382,313 A 1/1995 Eminger
5,865,918 A 2/1999 Franklin et al.
9,802,728 B1 10/2017 Rodgers et al.
2002/0157679 A1 10/2002 Yiu
2004/0144497 A1 7/2004 Bixen
2014/0014264 A1 1/2014 Bixen
2017/0334594 A1 11/2017 Woods et al.
2018/0334279 A1 11/2018 Korthäuer et al.

FOREIGN PATENT DOCUMENTS

CN 105438576 3/2016
CN 107380591 11/2017
CN 105775289 5/2018
CN 108794513 11/2018
DE 9304848 3/1993
DE 102008032019 1/2010

(Continued)

OTHER PUBLICATIONS

European Application No. EP 20 15 3937, European Search Report dated Aug. 14, 2020, 7 pages.

(Continued)

*Primary Examiner* — Michael N Orlando
*Assistant Examiner* — Joshel Rivera
(74) *Attorney, Agent, or Firm* — Fish & Richardson P.C.

(57) ABSTRACT

A label application system and method for applying a label to a package travelling on a conveyor along a conveying path includes: an applicator apparatus which is operable to move a label into contact with a package, a control system, which controls operation of the applicator apparatus, and a sensor system operable to detect an edge of the package, a distance from a reference point to the package, and the speed at which the package is travelling, wherein the control system is operable to receive and process the data from the sensor system relating to the package and initiate operation of the applicator apparatus such that the label is applied to the package in a desired position as the package moves in a direction of travel.

20 Claims, 10 Drawing Sheets

(56) References Cited

FOREIGN PATENT DOCUMENTS

| | | | |
|---|---|---|---|
| DE | 102010055157 | | 6/2012 |
| EP | 0026753 | | 9/1980 |
| EP | 2361837 | | 8/2011 |
| EP | 2495180 | | 2/2012 |
| EP | 2712689 | | 4/2014 |
| EP | 2998234 | A1 | 3/2016 |
| EP | 3031736 | A1 | 6/2016 |
| GB | 2005220 | | 9/1978 |

OTHER PUBLICATIONS

Extended European Search Report in European Appln No. 21153395.5, dated May 28, 2021, 7 pages.
GlobalSpec.com [online], "Vacuum Sensors Information," available on or before Feb. 2, 2018, via Internet Archive: Wayback Machine URL <http://web.archive.org/web/20180202073718/https://www.globalspec.com/learnmore/manufacturing_process_equipment/vacuum_equipment/vacuum_sensors>, retrieved on Feb. 14, 2022, URL <https://www.globalspec.com/learnmore/manufacturing_process_equipment/vacuum_equipment/vacuum_sensors>, 5 pages.
Reply to EP Office action, dated Aug. 2, 2021, with amended claims, filed on Jan. 28, 2022, in European Appln. No. 21153395.5, 7 pages.

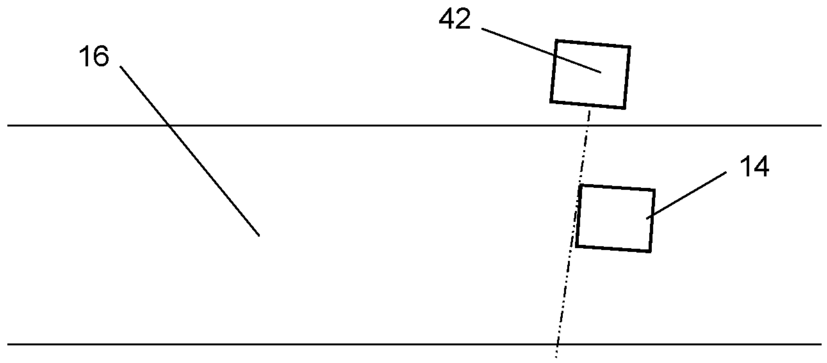
Figure 7b
Figure 8a
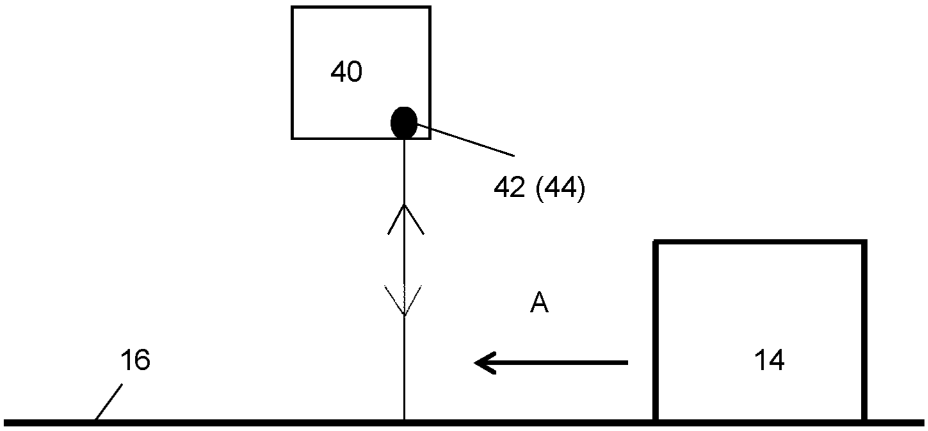
Figure 8b
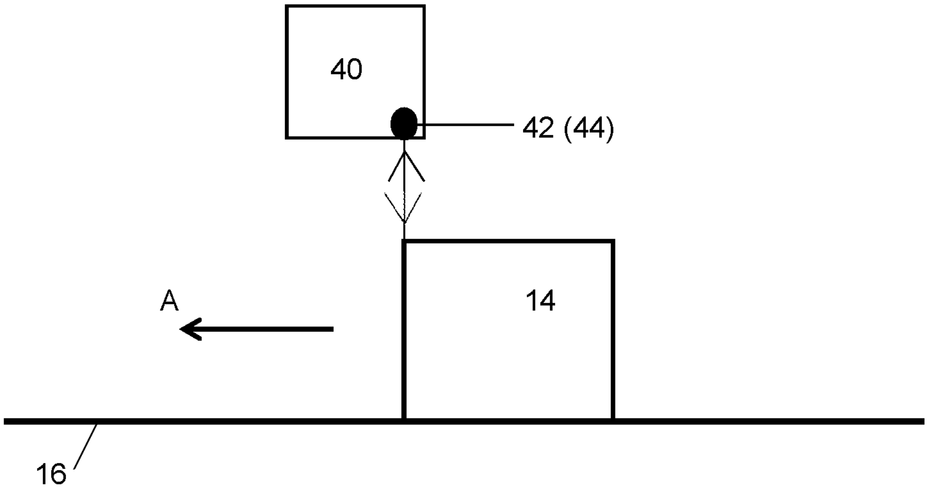

LABEL APPLICATION SYSTEM

CROSS-REFERENCE TO RELATED APPLICATIONS

This application claims the benefit under 35 U.S.C. § 119(a) of European Application No. EP20153937.6, filed Jan. 27, 2020.

BACKGROUND

The present invention relates to a label application system.

Printed labels are used in a wide variety of applications to provide information on item packaging, such as food labels. In some environments, an entire transport, packaging and labelling system is established in one location.

Items/packages are transported along conveyors (or other transport means) to a desired location in, for example, a warehouse or other facility, to allow further transport (by, for example, a vehicle, shipping container or rail carriage). Those packages have labels applied to their surface(s), so that information can easily be extracted about the contents. Those labels may be printed in a printing apparatus alongside or near to the conveyor/transport apparatus.

It is known in the art of printing, in particular label printing, for labels to be attached to a carrier web, which passes a printhead of a printing apparatus to be printed, before the labels are removed from the carrier web and applied to an item, for example a package. Each label is fed away from the printhead, towards an applicator pad, which is configured to apply the label to the required surface. Often, the side of the label which has printing/ink on it is held adjacent the applicator pad, typically by a vacuum. The applicator pad may then move relative to the printhead and/or a base station and/or a conveyor, towards a surface of the item/package to which the label is to be applied. The applicator places the attachment side of the label against the surface, such that the label adheres to the surface of the item/package.

It is known to provide actuators for moving an applicator to apply labels to a target surface. Known actuators include heavy and/or bulky moving parts and are typically pneumatically or electrically activated.

The actuators are controlled by a control system, which operates the actuator (and, thus, the position of the applicator) to apply a label. Typically, the actuators have no position or speed control (and/or feedback), which means that the "application cycle" (i.e. the time it takes between the control system initiating movement of the actuator and the applicator applying the label to the package) can vary.

For example, an actuator that is pneumatically activated may experience a variation in the air pressure in the cylinder fuelling the movement, which may result in a varying application cycle. This in turn may result in the application pad arriving near the package for label application at an undesired position relative to the package and/or an undesired time of application and, thus, unsatisfactory label application. Or, for example, the package may vary in position on the conveyor belt (or alternative transport system) and so the distance from the actuator/applicator and the package varies and/or the speed of the conveyor may vary. This results in an inconsistent application cycle because the actuator/applicator has a different distance to travel in order to reach the package (and, so the label applied will be positioned in a different potentially undesired location).

Actuators may be controlled at a set time interval. Alternatively, guides positioned on or before the conveyor belt (or other transport device) may be used to constrain a package in a specific location. However, the rate of packages may have to be decreased to ensure the packages are positioned for satisfactory label application.

SUMMARY

There is a need to position the labels on packages with more accuracy. A more consistent/accurately positioned label improves the efficiency of subsequent machinery that is required to read the labels (such as bar code scanning or other machine read operations). Thus, the position of labelling is becoming more important.

The current invention aims to alleviate one or more issues associated with the prior art.

According to a first aspect of the invention we provide a label application system for applying a label to a package travelling on a conveyor along a conveying path including: an applicator apparatus which is operable to move a label into contact with a package, a control system, which controls operation of the applicator apparatus, and a sensor system having operable to: an edge detector for detecting an edge of the package, a distance detector for detecting the distance from a reference point to the package, and a speed detector for detecting the speed at which the package is travelling, wherein the control system is operable to receive and process the data from the sensor system relating to the package each of the detector outputs and initiate operation of the applicator apparatus such that the label is applied to the package in a desired position as the package moves in a direction of travel along the conveying path.

According to a second aspect of the invention we provide a method of using a label application system for applying a label to a package travelling along a conveyor along a conveying path, the system including an applicator apparatus which is operable to move a label into contact with the package, a control system, which controls operation of the applicator apparatus, and sensor system, the method including the steps of: measuring the presence of an edge of the package, measuring a distance from the predetermined point to the package, measuring a speed at which the package is travelling, analysing the data provided by the sensor system with the control system, and calculating the appropriate time to actuate operation of the applicator apparatus, actuating the applicator apparatus in accordance with the appropriate time calculated, attaching a label to the package using the applicator apparatus.

Further optional features relating to the aspects of the invention are recited by the appended claims.

BRIEF DESCRIPTION OF THE DRAWINGS

Some embodiments of the present invention are described below with reference to the accompanying drawings of which:

FIGS. 6*a*, 6*b*, 7*a* and 7*b* illustrate a part of the label application system, FIGS. 8*a* and 8*b* illustrate a different embodiment of a label application system.

DETAILED DESCRIPTION

Figure 1:
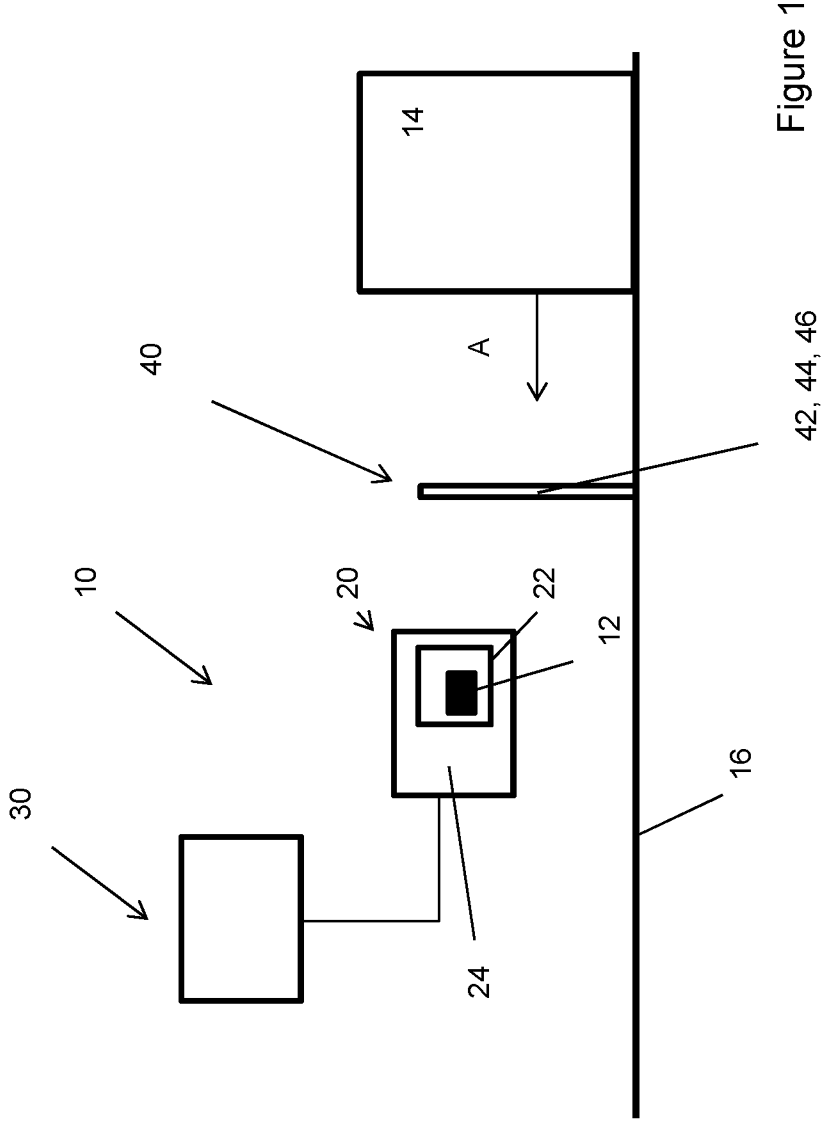
FIG. 1 is a view of an embodiment of a label application system.
Figure 2:
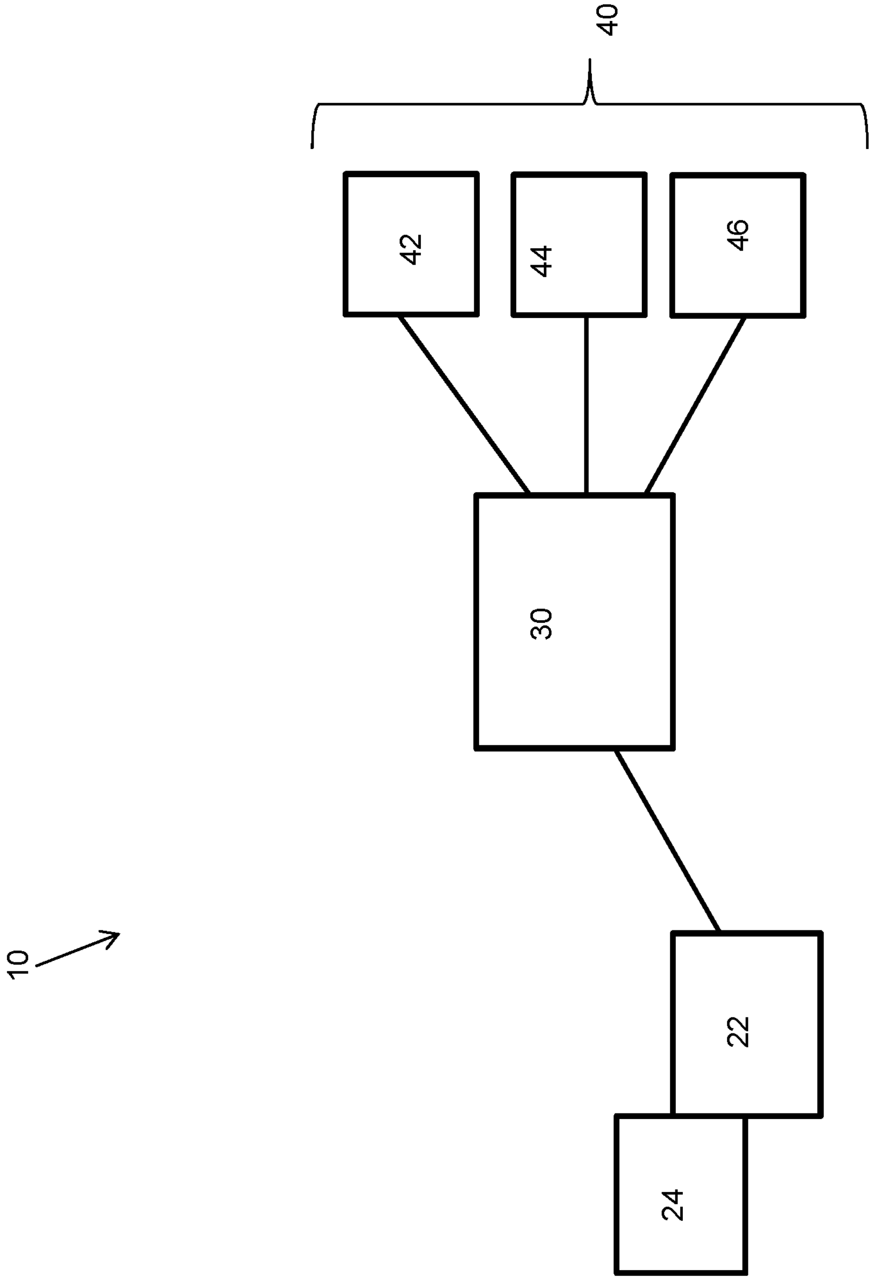
FIG. 2 is a diagram illustrating parts of an embodiment of the label application system.
Figure 3:
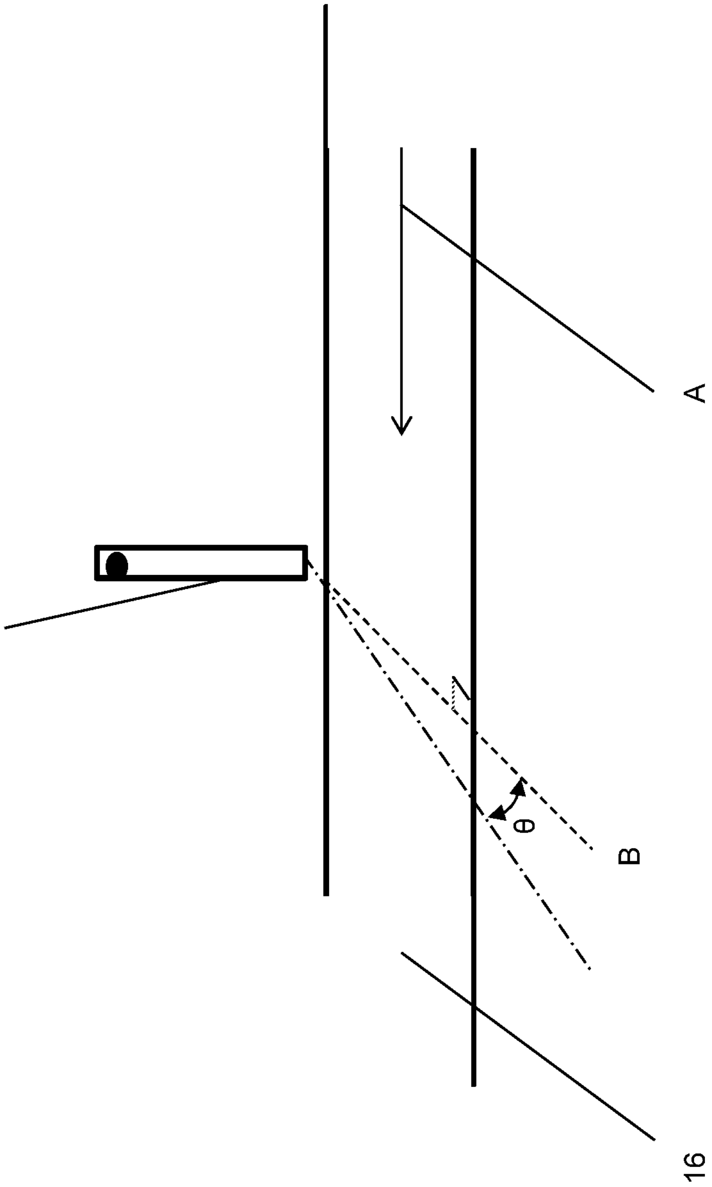
FIG. 3 is a view of part of a label application system.
Figure 4:
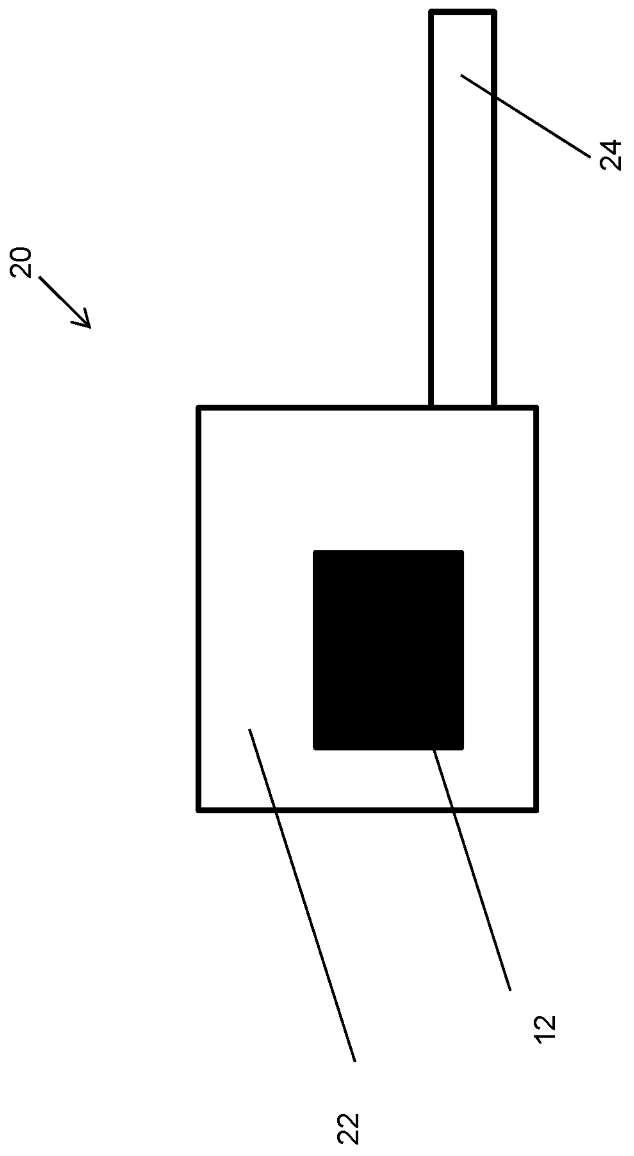
FIG. 4 is a view of part of a label application system.

In a packaging plant, items are packaged (i.e. wrapped in a protective layer to avoid damage and/or degradation of the contents and/or provide a carrier to transport the contents elsewhere) and before the packages leave the plant, labels are applied, which provides one or more pieces of information about the contents (e.g. expiration dates, barcodes, type and/or variety of food).

The packages are transported around a plant by way of a conveyor and as the package is transported, a label applicator operates to apply a label to a surface of the package. A label application system 10 controls the operation of the label applicator.

The label application system 10 is for applying a label 12 to a package 14 travelling on a conveyor 16 along a conveying path. The label application system 10 includes an applicator apparatus 20, a control system 30 and a sensor system 40.

The applicator apparatus 20 is operable to move a label 12 into contact with the package 14 (for example, the label 12 is adhered to a predetermined location on the surface of the package 14).

In some embodiments, the applicator apparatus 20 includes an applicator pad 22 or similar and an actuator 24 to which the applicator pad 22 is attached, for enabling movement of the applicator pad 22. The applicator pad 22 is configured to receive a label 12 for application to a package 14 (which, may be from a printing apparatus and/or taken from a carrier web of labels). The actuator 24 may include a motor which is operable to move the actuator 24 (and, therefore, the applicator pad 22) from a first position to a second position, in which the label 12 is applied to the package 14. For example, the applicator pad 22 may be moved so that the label 12 (or preferably the adhesive on the "back" of the label 12) touches or comes close to the surface of the package 14. The label 12 may be "lifted" away from the pad 22 by contact with the package 14. Alternatively, for example, an airstream flows through the applicator pad 22 and the label 12 is blown on to the surface of the package 14. It should be appreciated that there are a number of ways that the applicator pad 22 could be used to apply the label 12 to the surface of the package. An example of an applicator pad 22 that could be used as part of the label application system 10 is described in more details below.

The control system 30 controls operation of the applicator apparatus 20. In some embodiments, the control system 30 is connected via a communication link (for example, a wired or wireless signal connection) to the applicator apparatus 20 and the control system 30 controls when the applicator apparatus 20 is actuated to apply a label 12 to the package 14.

The control system 30 is connected to a sensor system 40. The sensor system 40 monitors predetermined characteristics of the package 14 that is being transported along the conveyor 16 and relays the data to the control system 30. The control system 30 processes/analyses the data from the sensor system 40 and determines the appropriate time/ideal time window in which to activate the applicator apparatus 20 (and, for example, apply the label 12 in the correct/desired position on the package 14 as it travels along the conveying path).

The sensor system 40 has one or more detectors which monitor aspects of the conveyor 16/package 14 travelling along. Examples of appropriate detectors are described in detail below. It should be appreciate that some detectors may be able to produce data relating to more than one aspect of the package 14, so a separate detector for each quantity that the control system 40 uses in its analysis may not be required.

In some embodiments, the sensor system 40 includes an edge detector 42, a distance detector 44 and a speed detector 46. Although, it should be appreciated that the sensor system 40 may include fewer or more detectors as desired and depending on the number of measurements the user wants to take and whether any detectors can be used for multiple measurements.

In FIG. 1, the detectors 42, 44, 46 are illustrated in the same physical location. It should be appreciated that this need not necessarily be the case and the different sensors may be positioned differently depending on the specific system that is implemented.

The edge detector 42 is configured to detect an edge of the package 14 on the conveyor 16 travelling along the conveying path. In some embodiments, the edge detector 42 is positioned to detect a front edge of the package 16 as it arrives at (or in line with) the edge detector 42.

In some embodiments, the edge detector 42 includes an emitter and a receiver. The receiver may be separate from the emitter (i.e. positioned in a spaced position relative to the emitter) or the receiver may be integral in the same housing/space as the emitter.

In some embodiments, the emitter is positioned on a first side of the conveyor 16 and the receiver is positioned on an opposing side of the conveyor 16. Thus, when the emitter emits a light beam (typically a laser beam or similar), this is received by the receiver. In other words, the edge detector 42 may comprise a light gate, in which a light beam 41 extends across the conveyor 16.

When no package is on the conveyor 16 in a detection position, the light beam 41 is received by the receiver. When the package 14 travels along the conveyor 16 and moves in front of the emitter, the light beam 41 being received by the receiver is broken/interrupted (as the package 14 travels along). The indication of the front most part of the package 14 (the front edge) has broken the light beam 41 between the emitter and receiver indicates the position of the package 14. In other words, the edge detector 40 provides a time stamp/indication of the time at which the (front edge of the) package 14 is located in a predetermined position.

In some embodiments it may be impractical to put a receiver or reflector opposite the emitter (for example, FIGS. 8*a* and 8*b*). In such an embodiment, a "time of flight" detector or triangulation detector may be used.

In a triangulation edge detector 42, the emitter emits a light beam towards a surface and the beam is reflected back towards the device and is received by the receiver.

The emitter and receiver may be spaced apart in specific positions relative to each other, so that a continuous light beam emitted from the emitter does not interfere with the light beam that is reflected from the surface and back to the receiver. In such a detector, the emitter emits the light beam at a specific angle, so that the reflected beam hits the receiver in a particular position depending on the distance between the emitter and the surface the light beam reflects from. In the context of the described system, as the package 14 travels along the conveyor 16, in front of the emitter, the light beam will be reflected from the surface of the package 14 instead of another surface "behind" the package 14 and the detector will detect a change in the measurement, which indicates an edge of the package has arrived, In a time of flight sensor, the emitter emits pulses of light at a predetermined frequency. When the pulse of light has been emitted, the emitter is switched off or inactive which allows the receiver to receive the light beam that is reflected from the surface. When a difference in the time taken for the pulse to be received is detected, this indicates that an edge of the package 14 has arrived. The frequency of the pulses is optimised to minimise the amount of travel a package 14 can do along the conveyor 16 before another pulse arrives and a difference in the distance will be detected.

Both of these discussed detectors can be used as an edge detector by detecting a change in the distance between the detector and the surface that is reflecting the light. Thus, an edge can be detected and no distance measurement is required as only a change in distance is important.

It should also be appreciated that the edge detector 42 which includes the emitter and receiver on the same side of the conveyor 16 may be mounted/positioned above the conveyor 16. In such an environment, the light beam or pulse may be reflected from the surface of the conveyor 16 (when a package 14 is not present). It follows that the light beam or pulse is reflected from the "top" surface of the package 14 as it travels past the emitter (this is illustrated in FIGS. 8*a* and 8*b*).

In some embodiments, the edge detector 42 is positioned/measures at an angle θ other than substantially perpendicular across the conveyor 16 (i.e. a perpendicular axis B that forms an angle of 90 degrees with the direction of travel of the conveyor). In other words, the edge detector 42 is angularly offset from perpendicular relative to the conveyor 16.

For example, the edge detector 42 may measure across the conveyor 16 at an angle θ between 2 and 8 degrees (and more preferably around 5 degrees) away from the perpendicular axis B. In some examples, the edge detector 42 may be positioned to measure across the conveyor 16 at an angle θ away from the perpendicular axis B and away from an approaching package 14 (e.g. the edge detector 42 is angled slightly away from a package approaching and towards the direction of travel A of the conveyor 16). In other words, the edge detector 42 makes an angle θ between 92 and 98 degrees (and more preferably, around 95 degrees) with the direction of the conveying path.

Figure 6A:
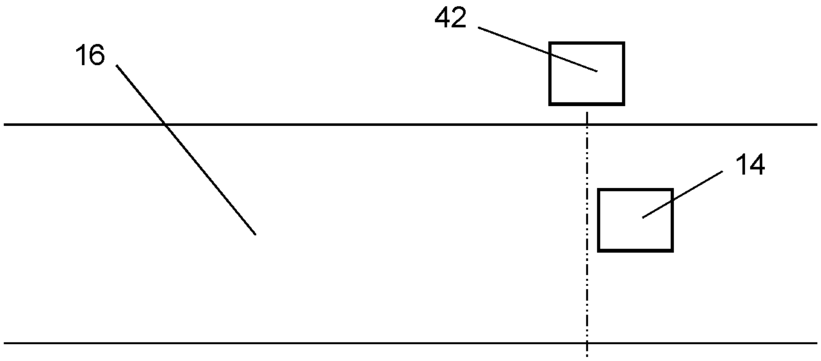
Figure 6B:
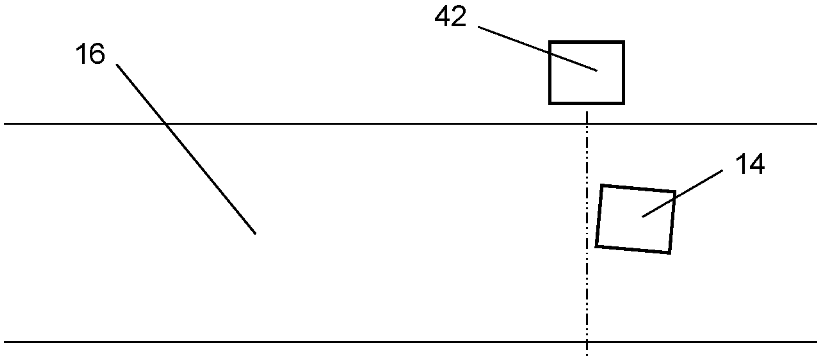
Figure 7A:
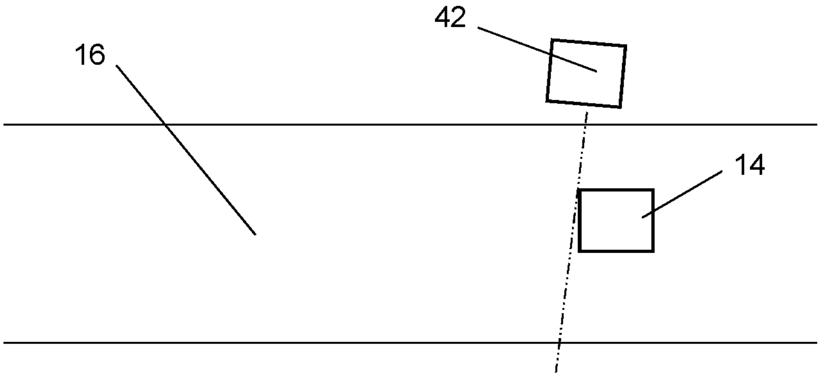

This configuration is particularly advantageous when using an edge detector 42 that relies on beam interruption by a surface of the package 14. Often, a package 14 travelling along the conveyor 16 will not be positioned "square" with respect to the edges of the conveyor 16. In this case, an edge detector 42 positioned to measure the front edge of the package 14 perpendicularly to the conveyor direction of travel may suffer inaccuracies due to the difficulty presented when measuring the package 14 that is positioned at an angle θ. This effect is illustrated in FIGS. 6*a*, 6*b*, 7*a* and 7*b*. FIGS. 6*a* and 6*b* shows an edge detector 42 positioned perpendicularly to the direction of travel of the package 14. In FIG. 6*a*, the package 14 is positioned "square" on the conveyor 16, so the edge detector 42 detects the nearest side/corner/surface of the package 14 (and, thus, an accurate assessment of where the package 14 is positioned can be made). However, in FIG. 6*b*, the package 14 is positioned at an angle relative to the conveyor 16, so the edge detector 42 detects the "far" side of the package 14 (i.e. the side of the package 14 furthest from the detector 42) and as a result the sensor system 40 receives inaccurate information about where the package 14 is positioned. This effect/inaccuracy is reduced when the edge detector 42 measures at an angle θ that is offset from the perpendicular axis B, which is illustrated in FIGS. 7*a* and 7*b*.

In FIG. 7*a*, the edge detector 42 is angularly offset towards the direction of travel on the conveyor 16 and the package 14 is positioned perpendicularly to the conveyor 16. In this case, the nearest/closest edge of the package 14 is detected. In FIG. 7*b*, the package 14 is positioned at an angle to the conveyor 16, but (because of the offset of the edge detector 42) the nearest edge of the package 14 is still detected. Thus, the edge detector 42 position as in FIGS. 7*a* and 7*b* (i.e. with the angular offset) provides a more accurate measurement than a perpendicular arrangement.

It should be appreciated that when the edge detector 42 is angularly offset from perpendicular across the conveyor 16, the distance measured to the package 14 will need to be corrected to find the actual distance between the edge of the conveyor 14 and the package 16 (for example, by using known trigonometric functions, etc.)

In some embodiments, the edge detector 42 comprises a machine vision system that includes an optical sensor (e.g. a camera) and a processor. The optical sensor is configured to monitor the area on the conveyor in front of the sensor. The processor is configured to assess the images recorded by the optical sensor and determine when a package 14 is present in the area being monitored. In such an embodiment, instead of a light gate being broken when the front edge of the package 14 passes through it, the machine vision system detects when a front edge of a package 14 comes into view/passes the optical sensor. The machine vision system may also be angularly offset from perpendicular across the conveying path (in the described example, across the conveyor 16).

Data relating to the presence of the front edge of the package 14 is sent to the control system 30 from the edge detector 42 for analysis.

It should be appreciated that there are numerous ways of detecting an "edge" of an object and different sensors may be used if desired.

Figure 5B:
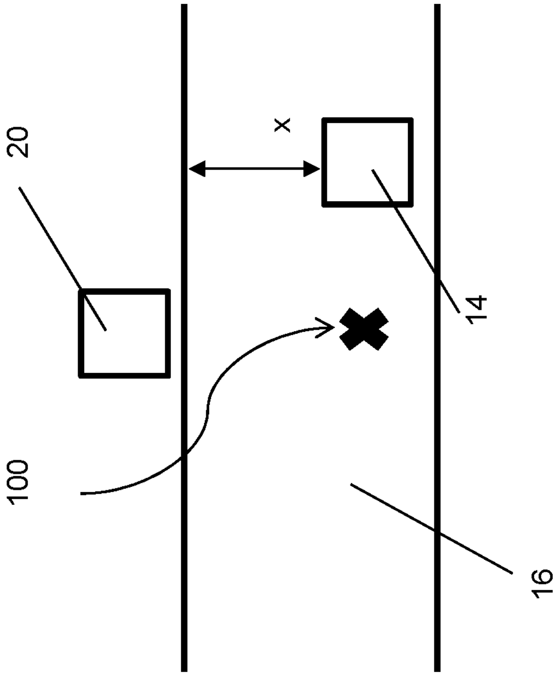
FIGS. 5*a* and 5*b* illustrates a label application system with different packages/at different time intervals.
Figure 5A:
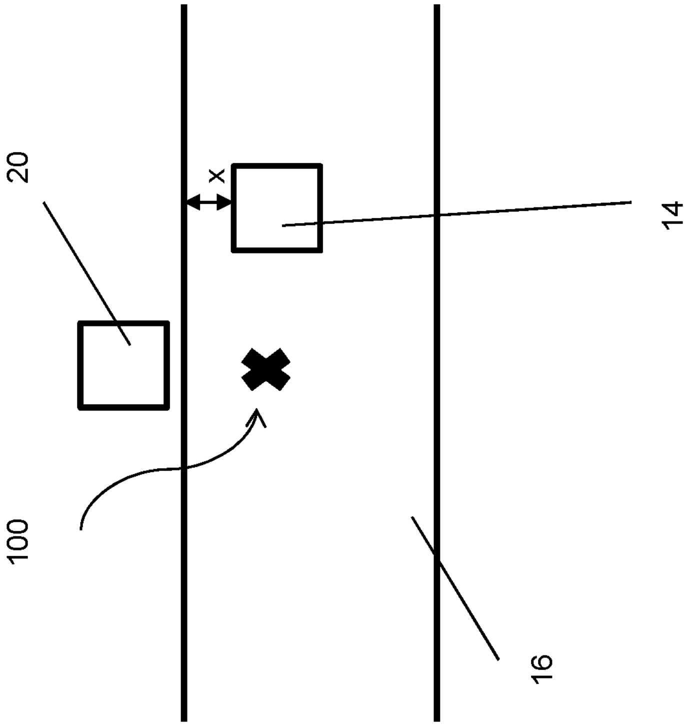

The distance detector 44 is configured to detect the distance to the package 14 from a reference point (which may be a point on the distance detector 44). The distance detector 44 measures the distance to the package 14 from the reference point, substantially perpendicular to the direction of the conveying path (e.g. perpendicular to the direction of travel of the conveyor 16). Referring specifically to FIGS. 5*a* and 5*b*, the distance detector 44 provides a measurement of the distance between the distance detector 44 and the package 14 (illustrated by "x").

In some embodiments, the distance detector 44 includes an ultrasonic beam emitter. The ultrasonic beam is emitted across the conveyor 16 and when a package 14 is travelling along the conveying path, the surface of the package reflects the ultrasonic beam/waves and the distance detector 44 receives the reflected waves. The time taken from emission to receipt (after reflection) allows the distance to be calculated.

In some embodiments, the distance detector 44 includes a laser beam emitter. In a similar manner to the ultrasonic beam above, the laser beam is emitted across the conveying path and when a package 14 is travelling along the conveying path (in front of the detector), the surface of the package reflects the laser beam and the distance detector 44 receives the reflected beam. The time taken from beam emission to beam receipt (after reflection) allows the distance to be calculated.

In some embodiments, the edge detector 42 could also be used as the distance detector 44 (see FIGS. 8*a* and 8*b*). For example, the edge detectors described above that rely on light beams or pulses being emitted, reflected from the surface and received could also be used to make a measurement of the distance from a reference point to that surface (the reference point may be the emitter of the detector or some other point predetermined relative to the detector). Thus, in addition to using the detector as an edge detector 42 and indicating whether there is a change in the distance being measured, the detector is also used as a distance detector 44 by providing an accurate measurement to the surface of the package 14 from a determined reference point.

It should be appreciated that different types of detector are advantageous for different types of environment. For example, a detector that uses a pulse of light, which is reflected from a surface (as discussed above) may be advantageous for detecting surfaces that may have transparent packaging. However, they may be too noisy to provide an accurate measurement of the distance.

Whereas, a detector that uses a continuous light beam reflected from a surface may be less noisy but much less able to measure from a surface with transparent packaging. Furthermore, where the sensor system 40 is to be located relative to the conveyor 16 may dictate which types of sensors are used. For example, if the sensor system is mounted above the conveyor 16 (sensing downwards towards to the conveyor 16) then a light gate based detector is not usable, so a time of flight/measurement based on beam reflection will be used. Thus, it should be appreciated that the detectors are selected and tuned in order to optimise the overall label application system 10.

The distance detector 44 sends the distance information measured to the control system 30. The control system 30 can assess, using its knowledge of parameters of the system, the distance between the package 14 and another point/location (which could be a location other than the distance detector 44 position itself) if required. For example, if the distance detector 44 is positioned in a location away from the edge of the conveyor 16, the distance between the distance detector 44 and the conveyor edge will need to be taken into account in any measurements made by the detector 44 by the control system 30.

The speed detector 46 is configured to measure the speed that the package 14 is travelling along the conveying path (in this example, along the conveyor 16).

In some embodiments, the speed detector 46 determines the speed of the package 14 by recording the time taken for the package 14 to travel a known distance. In such an embodiment, the speed detector 46 includes a first device and a second device positioned a known distance apart from each other along the conveying path/conveyor 16. The first device may include an emitter and a corresponding receiver and the second device may include an emitter and a corresponding receiver. In this case, each emitter is configured to emit a light or ultrasonic beam and each receiver is configured to receive the light or ultrasonic beam emitted by its respective emitter. Thus, as each of the first and second devices detects a change in the position of the surface that is reflecting the beam, a time stamp can be given (which allows the speed of the package 14 to be assessed).

In some embodiments, the edge detector 42 (which may also be the distance detector 44) may act as one of the first or second devices of the speed detector 46.

For example, the emitter/receiver used for the edge detection may also be used to initiate (or end) the time measurement for the speed detector 46. In other words, a time stamp taken when an edge is detected may be used to provide information relating to the known position of the package 14 at a known time. A second device may positioned earlier or later along the conveying path, so that a measurement of the speed of the package 14 can be deduced. The second device could be one of the edge detector 42 or distance detector 44 if separate ones of these detectors are used or, alternatively, a separate detector could be used (such as a light gate, etc.)

In some embodiments (such as those that already use a machine vision system); a machine vision system is used to record the speed of the package 14 along the conveying path. For example, the speed can be recorded by analysing adjacent frames recorded by the optical sensor and determining how quickly a package 14 is travelling through the frames.

In some embodiments, data relating to the speed of the conveyor 16 is transmitted to the control system 30. This can be used as an estimate of the speed the package 14 is travelling. In such an example, an encoder may be connected to the conveyor 16 itself to provide a measurement of the speed with which the conveyor is moving (for example, the speed with which the conveyor belt or rollers are moving). Alternatively, a controller that controls the operation of the conveyor may provide information about the speed of the conveyor 14 to the control system 30 directly.

It should be appreciated that using the speed of the conveyor 16 as an estimate of the speed of the package may be less accurate than monitoring the package 14 directly because the package 14 could get caught on an obstacle and not travel at the speed expected by the measured/monitored speed of the conveyor 16.

The control system 30 is operable to receive and process data from the sensor system 40 relating to the package 14. The data relates to each of the measured variables (i.e. each of an edge measurement, distance measurement and speed measurement). This may come from three separate detector 42, 44, 46 outputs or from outputs from fewer detectors that are operating to provide measurement relating to more than one aspect of the package 14. The control system 30 calculates the initiate operation of the applicator apparatus such that the label is applied to the package 14 in a desired position as the package 14 moves in a direction of travel along the conveying path.

In some embodiments, the control system 30 controls a motor system (which operates the actuator 24 to move the applicator pad 22 to the desired position). The motor speed and position are controlled to ensure that the applicator pad 22 travels the desired distance/to a desired position in a known time.

Figure 10:
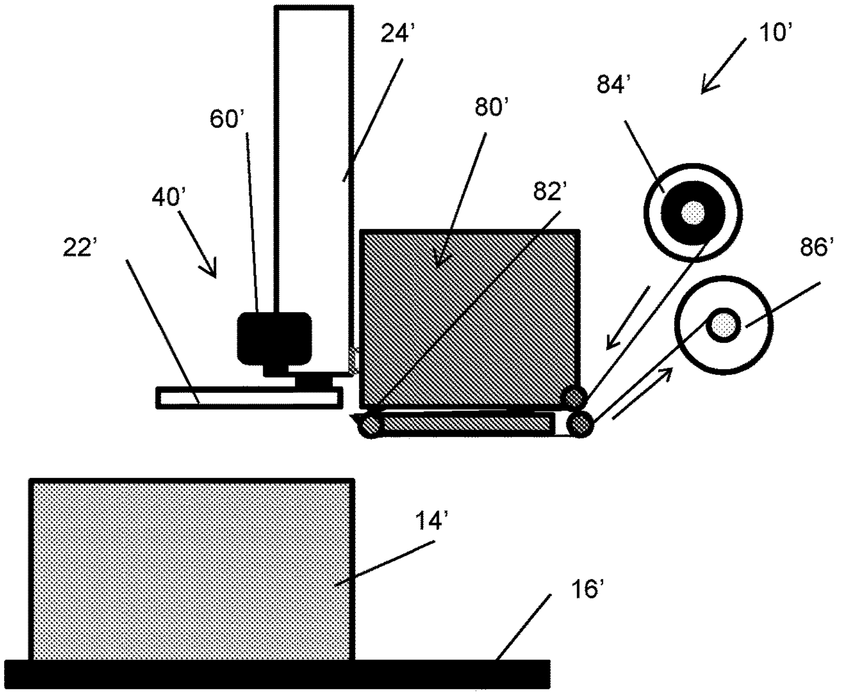
FIGS. 10 and 11 are orthogonal views which illustrate a further embodiment of a label application system.
Figure 11:
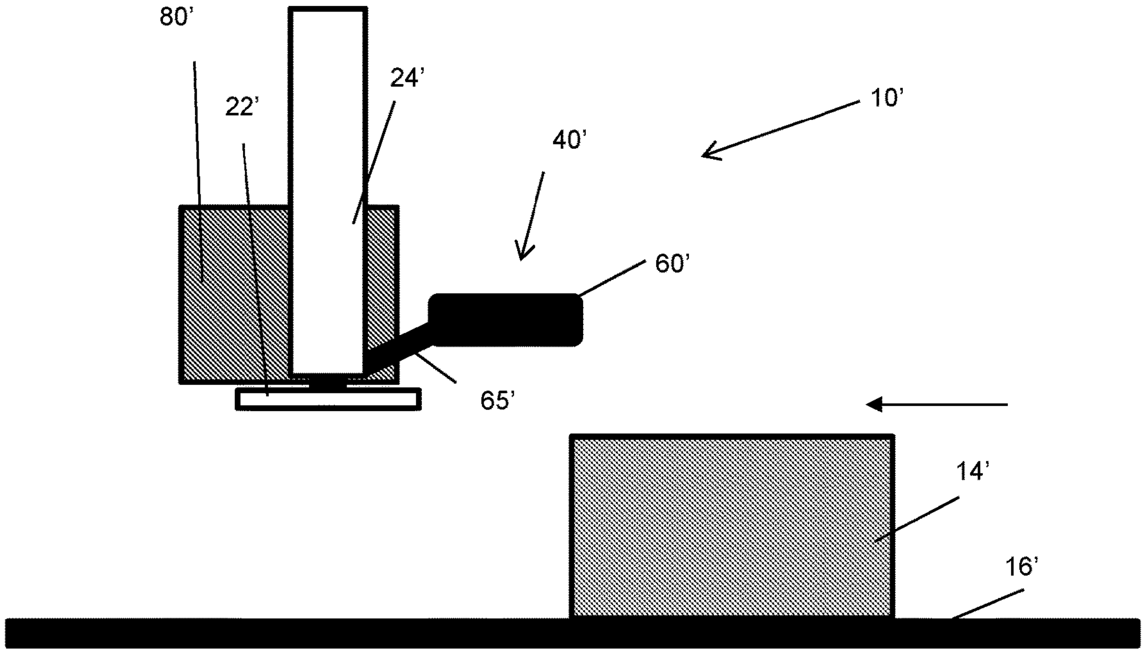
Figure 12A:
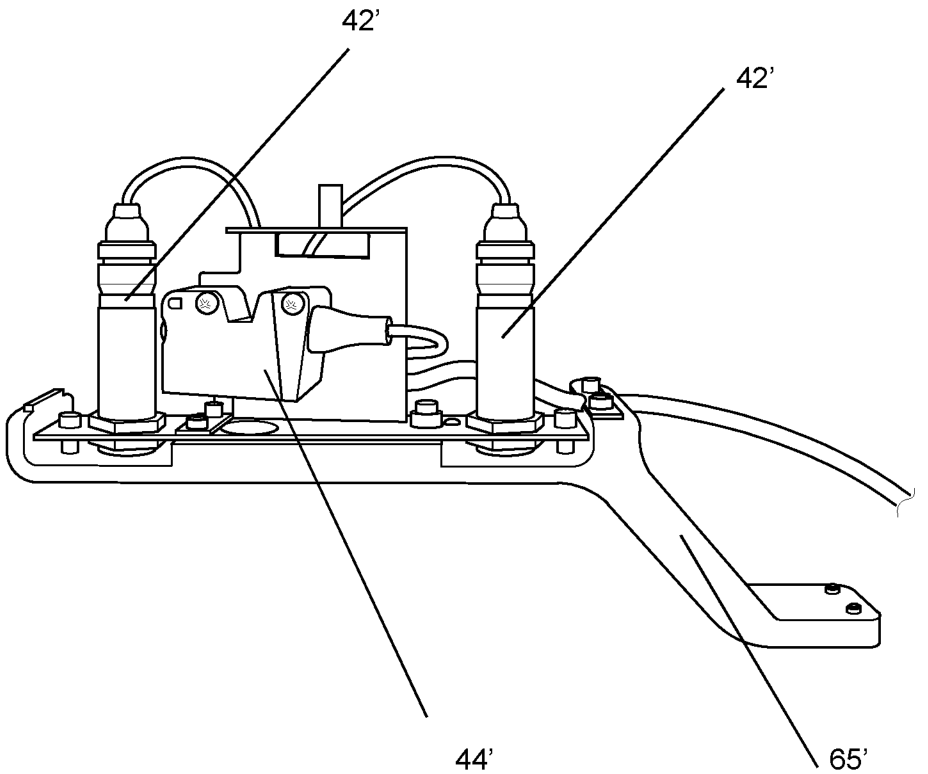
FIGS. 12*a* and 12*b* are different views of part of the label application system.
Figure 12B:
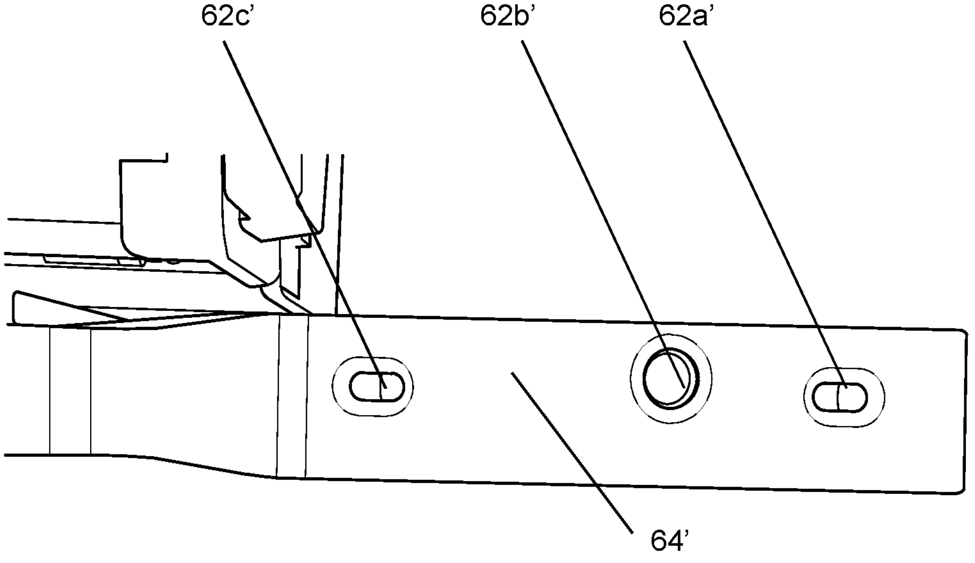

FIGS. 10 and 11 illustrate example views of the label application system 10' from different angles—in FIG. 10 the package is travelling away and in FIG. 11 the package is travelling left. Features that have already been described above in general terms maintain the same reference number in the following description with the addition of a prime symbol (e.g. sensor system 40 will become sensor system 40'). It should be appreciated that the system/parts of the system illustrated in FIGS. 10 to 12 show details of an implementation of the system. The features set out in the following description can be combined with other described features unless stated otherwise.

The sensor system 40' and the applicator pad 22' are positioned above the conveyor 16'. In this example, the package 14' travelling along the conveyor 16' passes underneath first the sensor system 40' and then subsequently the applicator pad 22' (as such, the applicator pad 22' moves down/up in a label application cycle and, in this example, the label is applied to a surface facing upwards of the package 14'—but it should be appreciated that the applicator pad 22' may be configured to move up/down and apply a label to a differently facing surface).

The sensor system 40' is housed in a single sensor housing 60'. The applicator pad 22' is attached to the actuator 24', so that it can be moved as necessary to apply the label to the package 14'. The actuator 24', in this example, has a single housing also. The sensor housing 60' is attached to the applicator apparatus 20', by a connector device, in an upstream position (of the conveyor 16'). In other words, the sensor housing 60' is located in a position in which a package 14' will pass the sensor system 40' before the package 14' arrives at the applicator pad 22'.

The connector device holds and supports the sensor system 40' in a known position relative to the applicator apparatus 20' (in the illustrated example, the connector device extends between the sensor housing 60' and the actuator housing). This allows for simpler installation of the label application system 10' when a user is first setting the system up next to the conveyor 16' and also permits a simpler calibration process for the user/control system to ensure the detectors are calibrated to provide signals that are usable by the control system.

It should be appreciated, that if the applicator apparatus 20' is positioned on the opposing side of the conveyor 16', the sensor system 40'/sensor housing 60' can be positioned on the opposing side of the applicator apparatus 20', so that it is still positioned upstream of the applicator pad 22' relative to the direction of the conveyor 16'.

The connector device may include a bracket section 65' and attach to the actuator 24' using threaded bolts or other known attachment means. The bracket section 65' may be manufactured from a metal material.

The bracket section 65' may also form a part of the sensor housing 60' (for example, a bottom surface 64' of the housing 60'). This may be advantageous as it reduces the number of parts required to construct the sensor housing 60' and thus makes calibration steps simpler after manufacture (and if the bracket section 65' is made from a rigid material (such as metal), then it provides additional structural strength to the housing 60' and may allow the remainder of the housing 60' to be made from a material which is relatively less strong).

As discussed above, the sensor system 40' in this includes sensors configured to detect different characteristics of the approaching package 14'. The sensor system 40' includes three detectors—first and second edge detectors 42' and a third (distance) detector 44'. In this example, the three separate detectors are arranged substantially aligned with each other (in this case positioned and attached to the bracket section 65' in the sensor housing 60').

The bottom surface 64' of the housing 60' defines three openings **62*a*', 62*b*' 62*c*', each of which corresponds to one of the detectors 42', 44'. Each of the openings 62*a*', 62*b*', 62*c*' provides an aperture for the emitter/receiver of each of the detectors of the sensor system 40'. For example, the first opening 62*a*' corresponds to the first edge detector 42' and allows the beam to be emitted through the opening 62*a*' towards the conveyor 16' (as the sensor system 40' is positioned above and towards the conveyor 16') and the beam returning from the conveyor 16'/package 14' is received by the receiver through the opening 62*a*'. The second and third openings 62*b*', 62*c*' correspond to the second edge detector 42' and third detector 44'** and allow those to operate in the same way.

In this example, the speed detector 44' is formed by the first and second edge detectors. The first edge detector 42' emits a signal indicating when the edge of the package is detected (as discussed in detail above). The first edge detection is used for speed detection as the time from the first edge detector signal to the second edge detector signal (which detects the same edge as the first detector a known distance along the conveyor 16') is used to calculate the speed the package 14' is travelling (for example, the signals coming from each of the first and second edge detectors 42' have a time stamp from which the time elapsed is calculated). Since the first and second edge detectors 42' are used to assess the speed of the package as well as detecting the edge of the approaching package 14', it is advantageous if both the first and second edge detector 42' are arranged at the same angle with respect to the conveyor 16' (the advantages of introducing an angle to the detector detecting an edge of the package 14' is discussed in detail above).

In some embodiments, the first and second edge detectors 42' are separated by between 100 mm and 150 mm (and preferably by about 120 mm). The third detector 44' is positioned approximately mid-way between the first and second edge detectors 42'.

Alternatively (for example, FIGS. **12*a* and 12*b*), the distance detector 44' is positioned closer to the first edge detector 42' than the second edge detector 42'. This arrangement may be particularly advantageous so as to measure the distance to the package 14' as close as possible to the first edge detected by the first edge detector 42'** so that a triangulation of the position can be calculated by the control system even before any speed valve has been measured.

FIGS. 10 and 11 also show how a label printing apparatus 80' may be positioned relative to the applicator apparatus 20' and the sensor system 40'. The printing apparatus 80' is a thermal transfer printer and includes a printhead 82' and an inked ribbon (not shown). The printhead 82' is selectively heated and pressed against the inked ribbon, so that ink can be melted onto a substrate that passes underneath. In this case, the substrate is a label tape which is supplied from a supply roll 84' and passed underneath the printhead 82'. The newly printed label is peeled off the backing material and the backing material is wound into a waste roll 86' while the printed label is positioned on the applicator pad 22' (process described in detail below).

This example of the label application system 10' operates in the following manner. The sensor system 40' continuously monitors the conveyor 16' as it passes underneath. It should be appreciated that the term "continuously" in this sense does not necessarily mean that a beam is emitted at all times from the detectors 42', 44'—in some cases a beam may be emitted at a specified frequency (discussed above). In other words, the sensor system 40' is powered and ready to detect a package 14' on the conveyor 16' should it arrive at any time.

As illustrated in FIG. 11, the sensor system 40' provides the triggering system for operating the applicator apparatus 20' (in other words, for actuating the applicator pad 22'), so that a label can be attached. As the package 14' approaches the sensor system 40', the first edge detector 42' provides the first signal relating to the package 14'. As the front edge of the package 14' passes between the first edge detector 42' and the conveyor 16', the change in the reflected beam is assessed by the control system, so that the package 14' is detected. This first signal that the package 14' is arriving allows the control system to prepare the applicator apparatus 20'—in other words, detection of the front edge of the package 14' is the first trigger used in the application cycle.

Next the package 14' arrives under the distance detector 44, which provides a signal indicative of the distance between the detector 44 and the surface of the package 14' that the beam reflects from. As the sensor system 40' is located in a known position relative to the applicator apparatus 20' (i.e. relative to the actuator 24' and/or the applicator pad 22'), the control system can calculate how the applicator pad 22' needs to be moved to present the label in the desired location on the package 14'.

Finally, the front edge of the package 14' is detected by the final detector (second edge detector 42') of the sensor system 40'. The signal from the second edge detector 42' completes the data acquisition relating to this package 14' (in other words, the last signal provides the information required by the control system to assess the speed of the package 14'). The control system knows where the package 14' will be and when relative to the applicator pad 22' and can complete the trigger process to ensure the application cycle proceeds and attaches the label as desired (discussed in more detail below).

Within the packaging industry, trigger mechanisms are often distributed alongside any conveyor used to move the package. Each mechanism is typically a bespoke installation requiring a skilled engineer. Embodiments of the present invention allows for the sensors to be positioned in a single housing/enclosure, which may be attached directly to the actuator housing. This reduces the installation effort by simplifying and standardising the connection to the control system and pre-defining critical dimensions such as the distance of the sensor(s) from the applicator. This simplification improves the reliability of packaging systems.

In some embodiments, the actuator motor system uses stepper motors. In such an example, the motor system may be an open or closed-loop control system and run with a position encoder to provide feedback on the position/movement of the motor. The position encoder may be mounted on a part of the motor (for example, on a rotor of the motor).

It will be appreciated that similar functionality can be achieved using other electric motor types, for example a brushless DC (BLDC) motor or a servo motor. BLDC motors may be used. Sensor-less motor control technology may be used with the BLDC motors, for example, systems provided by Microbeam SA.

In some embodiments, the control system controls the motor system to enable rotor speed and position monitoring. Such monitoring may be provided as part of a 'sensorless' drive system. For other types of motor this may be derived from a rotary encoder mounted on the motor, for example.

The control system includes a memory, which stores the physical parameters of the actuator 24 and pad 22; this includes the inertia of all moving components and the expected friction of bearing surfaces.

In some embodiments, the actuator 24 is coupled to the motor via a drive belt, which converts rotary motion of the motor to linear motion of the actuator 24. A drive belt tensioner may be provided to maintain an acceptable tension in the drive belt.

Figure 9:
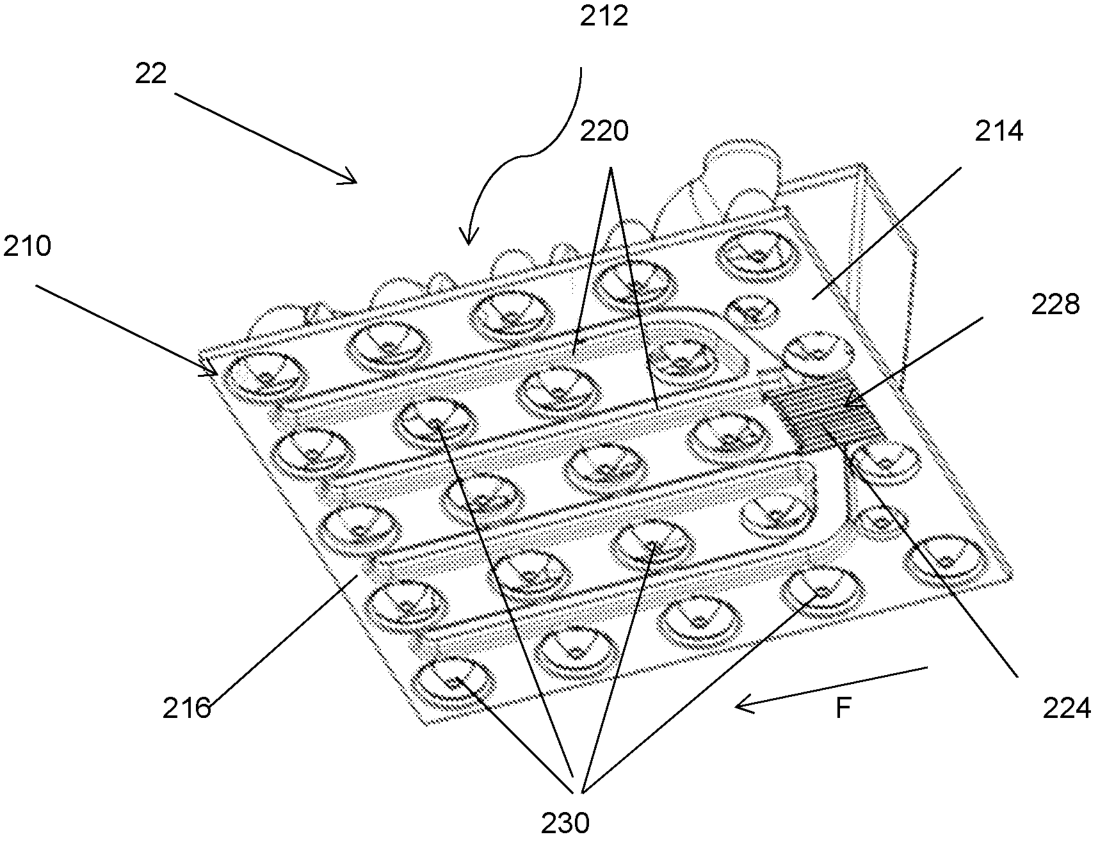
FIG. 9 illustrates an applicator pad that may be part of the label application system.

FIG. 9 illustrates an example of the applicator pad 22 for the applicator apparatus 20. In this example, the applicator pad 22 has a first side or label receiving side 210 and a second side 212. The applicator pad 22 also has a label entrance edge 214, and an opposite edge 216.

In some embodiments, the applicator pad 22 includes a conduit arrangement 220, which, in embodiments, includes a plurality of conduits 222 which are fluidly communicable with one another. The conduit arrangement 220 is also fluidly communicable with an inlet 224, which may be an air inlet. In embodiments, the inlet 224 may be fluidly communicable with each of the conduits 222. The inlet 224 is positioned adjacent the label entrance edge 214.

In some embodiments, the inlet 224 and at least a part of the conduit arrangement 220 are fluidly communicable with the label receiving side 214 of the applicator pad 22. Fluid, for example air, may be drawn into the applicator pad 22 via the inlet 224 and/or a part of the conduit arrangement 220. The inlet 224 may have a large cross-sectional area in the plane of the label receiving side 214.

The applicator pad 22 may include a guard formation 228 which may inhibit labels and/or foreign objects entering (for example being sucked into) the inlet 224. The guard formation 228 may include one or more ribs that extend across at least a part of the inlet 224. The or each guard rib may extend in a plane which is substantially perpendicular to the plane of the applicator pad and hence substantially perpendicular to the cross-section of the inlet 224.

The label receiving side 214 may include a surface with a lowered friction coefficient (for example, a roughened or textured surface or a surface with a coating or the like). This provides a low adherence or "non-stick" effect which is advantageous in a situation where the adhesive side of a label 12 comes into contact with the applicator pad. Such a label 12 may be easily removed manually, or may even fall off of its own accord as a result of the lowered friction coefficient between the label 12 and the surface.

The purpose of the conduit arrangement 220 and the inlet 224 is to provide a suction or vacuum effect, which is capable of holding the label 12 adjacent the label receiving side 214 of the applicator pad 22, for example, against gravity. An air flow generator, for example a fan, is provided, and is fluidly connected with the inlet 224. The conduit arrangement 220 and/or the inlet 224 enables labels 12 to be attracted towards the applicator pad 22.

In some embodiments, the applicator pad 22 includes an air distribution arrangement. In the illustrated example, the air distribution arrangement includes a plurality of outlet nozzles 230 (which are distributed across the label receiving side 210 of the applicator pad 22). Each of the outlet nozzles is fluidly connected to a distribution conduit, so that fluid (for example, air) may flow towards the outlet nozzles 230 (from an air source and/or generator, for example).

Such an applicator pad 22 including an air distribution arrangement may be particularly advantageous when an impact between the applicator pad 22 and the package 14 undesirable and/or not possible. For example, if the package 14 is delicate, or an item beneath the surface of the package 14 is delicate and/or fragile and/or the package 14 that is receiving the label 12 is uneven then is it beneficial to provide a labelling mechanism that can apply the label without coming into contact with the package 12. In such situations, it is desirable to apply the label by blowing the label on to the package 14.

As mentioned above, the applicator pad 22 forms part of an applicator apparatus 20, and is attached to an actuator 24, which effects movement of the applicator pad 22.

The applicator pad 22 is supported and coupled to the actuator 24 by an attachment member, and in some embodiments, the attachment member provides at least one of mechanical coupling and pneumatic coupling between the applicator pad 22 and the actuator 24. The attachment member may be flexible or at least a part of the attachment member may be flexible and/or articulated, to enable the position and/or orientation of the applicator pad 22 relative to the actuator to be adjusted. Such manoeuvrability enables the applicator pad 22 to conform to a surface to which the label 12 is to be applied.

It is possible for this adjustment to be made passively, in the event that the applicator pad 22 contacts the surface to which the label 12 is to be applied, or actively, if the labelling apparatus determines that the position or orientation of the surface to which the label 12 is to be applied is different from the current position or orientation of the applicator pad 22. The adjustment of the position and/or orientation of the applicator pad 22 may be made by a combination of active and passive adjustment.

The method of using the label application system 10, 10' will now be described. The method of operating the label application system 10, 10' includes the steps of using the sensor system 40 to measure parameters relating to the package 14, 14'. The method includes measuring the presence of an edge of the package 14, 14' using the edge detector 42, 42', measuring a distance between the package 14, 14' and the sensor system 40, 40' using a distance detector 44, 44' and measuring a speed at which the package 14, 14' is travelling. The sensor system 40, 40' sends the data to the control system 30, and the control system 30 calculates the appropriate time to actuate operation of the applicator apparatus 20, 20'. The method further includes actuating the applicator apparatus 20, 20' in accordance with the appropriate time calculated and attaching a label 12 to the package 14, 14' using the applicator apparatus 20, 20'.

In some embodiments, the control system 30 stores one or more parameters about the system and/or about a desired placement for the label 12 on the package 16, 16'. In some embodiments, the control system 30 allows one or more parameters to be set by a user, such as a packaging line operator. For example, a user may set a desired position for the label 12 (i.e. set the distance between the front edge of the package 14, 14' and the label 12 position), a desired height above the conveyor surface for the label 12 position, the desired speed of the conveyor 16, 16' and/or the type of label application (e.g. whether a label 12 should be blown onto a package 14, 14' from the applicator pad 22, 22' or whether it should be placed with a force of the surface (i.e. make contact with the surface) of the package 14, 14').

Time and distance calculations can be used to determine the time the package 14, 14' will be in the correct position relative to the applicator 22, 22' for the label 12 to be applied. Using the data provided from the edge detector 42, 42' the control system 30 knows when the package 14, 14' arrived at a predetermined position 100. From the speed detector 46, the control system 30 can assess the time it will take for the package 14, 14' to travel from that predetermined position 100 to the position in which the label 12 can be applied (i.e. an application position 102). The control system 30 also has knowledge of the time taken for an application cycle. Thus, the control system 30 assesses the time delay (from the package arriving at the predetermined position 100) required before initiating the applicator apparatus 20 to begin an application cycle, so that the label will be applied in the application position 102.

Further, using data provided by the distance detector 44, 44', the control system 30 also determines the distance (that the package 14, 14' will be) from the applicator apparatus 20, 20'. In some embodiments, the control system 30 adjusts one or more parameters relating to the application cycle of the applicator apparatus 20, 20'. For example, the control system 30 may make adjustments to the distance the actuator 24, 24' moves the applicator 22, 22' during the applicator cycle. In other words, to account for the different distance d between the package 14, 14' and the edge of the conveyor 16, 16', the control system 30 may specify that the actuator 22, 22' should position the applicator 22, 22' with an increase or reduction along direction x. In another example, the package 14, 14' may be at an angle/not straight with respect to the edge of the conveyor 16, 16', the control system 30 may account for that difference in angle by controlling the actuator 24, 24' to place the applicator 22, 22' at an angle to complement the positioning of the package 14.

The control system 30 takes into account the three parameters discussed in detail above and determines the appropriate time (or an appropriate time period) to actuate the applicator apparatus 20, 20', so that the label 12 is applied to the package 14, 14' in the desired position. Furthermore, the control system 30 can set the travel time for the applicator pad 22, 22' to move to the desired application position, so this information combined with knowledge of the position and speed of the package 14, 14' provide an advantage over previous systems. Previous systems have little or no feedback of where a package is located in the system and have limited control over the applicator, thus, the application of the label cannot be guaranteed to be in a desired and/or ideal location. Whereas the system described here is able to trigger the applicator pad 22, 22' to move at the desired time and controls the entire application cycle which allows for better control/placement of the label on the package 14, 14'.

It should be appreciated that the term package used in the description is intended to include a broad range of items that may require a label attached to them. For example, a package may include boxes holding a single item or multiple items (which may be a regular shape), or an individual item such as a food stuff (that may be more irregularly shaped).

Thus, different applicator pads 22, 22'/different mechanisms for applying the label 12 to the package 14, 14' may be employed. In some embodiments, the control system 30 operates to ensure a label 12 is positioned on the applicator pad 22, 22' at the appropriate time (i.e. in a positioned ready for application to a package 14, 14').

In some embodiments, the label 12 is transported away from a printhead of a printing apparatus, typically by motor-driven spools which wind a carrier web bearing a series of labels 12 in the required direction. Each label 12 (which has a leading edge and a trailing edge) is separated from the carrier web, for example, by a peel-off roller or blade. The leading edge of the label 12 is separated from the carrier web before the trailing edge.

Once separated from the carrier web, the label 12 travels towards the label entrance edge 214 of the applicator pad 22. In some embodiments, the leading edge of the label 12 moves onto the label receiving side 210 of the applicator pad 22 before the trailing edge of the label 12 has been separated from the carrier web.

In some embodiments, the label 12 moves across the label receiving side 210 of the applicator pad 22 (in the direction of arrow F in FIG. 9). As the label 12 moves, at least a part of the label 12 covers an increasing proportion of the inlet 224 of the applicator pad 22. As the inlet 224 is covered, air is sucked through at least a part of the conduit arrangement 220.

As the label 12 continues to travel in the direction of arrow F, the conduit arrangement 220 is progressively covered, and air is sucked through an uncovered part or parts of the conduit arrangement 220. Thus, as the label 12 moves across the applicator pad 22, the effective air inlet(s) (i.e. the part or parts of the air inlet 224 and/or the conduit arrangement 220 which is/are uncovered at a given moment) moves further away from the label entrance edge 214 of the applicator pad 22. This enables the transfer of labels 12 having a range of sizes by the same applicator pad 22.

Air may continue to be sucked into the applicator pad 22 until the label 12 has been applied to the package 14. Once the label 12 has left the applicator pad 22, the suction may be halted or reduced until the next application cycle.

In some embodiments, the actuator 24 moves the applicator pad 22 to an application position in which the applicator pad 22 comes into contact with the package 14 (and the adhesive on the label 12 contacts the package 14) and the label 12 lifts from the applicator pad 22. In some embodiments, the actuator 24 moves the applicator pad 22 close to the package 14 and the air distribution arrangement expels air from the outlets nozzles to blow the label 12 towards (and onto) the package 14.

In some embodiments, the angle of the applicator pad 22 is actively moveable by the actuator 24 (via the attachment member), so that the applicator pad 22 can be positioned in an ideal position and/or angle relative to the approaching package 14. In some embodiments, the angle of the applicator pad 22 is adjustable but not actively by the actuator 24. The attachment member may permit "passive" movement of the applicator pad 22 to adjust angle as it contacts an object (e.g. an oncoming package 14 to which a label is to be applied). In some embodiments, the attachment member may include a biasing mechanism that biasing the applicator pad 22 to a first (i.e. neutral) position and permits the applicator pad 22 to adjust its angle when it contacts an object and offers resistance to the bias.

It should be appreciated that the term "conveyor" should not be considered to be an indication of the mechanical apparatus being used. The term "conveyor" is intended only to indicate that the package is being conveyed (i.e. transported) from a first location to a second location. Thus, this wording encompasses a "typical" conveying apparatus using moving belts, sections or balls to provide a surface that transports an item in a desired direction and also includes other apparatus types that may be used to transport items in a specific path to a desired destination (for example, one or more automated or robotic devices that provide this functionality).

Aspects of the invention are outlined in the following clauses:

1. A label application system for applying a label to a package travelling on a conveyor along a conveying path including: an applicator apparatus which is operable to move a label into contact with a package, a control system, which controls operation of the applicator apparatus, and a sensor system operable to detect an edge of the package, a distance from a reference point to the package, and the speed at which the package is travelling, wherein the control system is operable to receive and process data from the sensor system relating to the package and initiate operation of the applicator apparatus such that the label is applied to the package in a desired position as the package moves in a direction of travel along the conveying path.

2. A system according to clause 1 wherein the sensor system includes an edge detector for detecting the edge of the package.

3. A system according to clause 2 wherein the edge detector includes an emitter that emits a continuous light beam or emits pulses of light at a predetermined frequency.

4. A system according to clause 3 wherein the edge detector or the emitter emits light at an angle which is angularly offset from an axis extending perpendicular to the direction of the conveying path.

5. A system according to clause 4 wherein the edge detector is angularly offset towards the direction of travel along the conveying path.

6. A system according to clause 4 or 5 wherein the edge detector is positioned at an angle of between 2 and 8 degrees away from an axis extending perpendicular to the direction of the conveying path.

7. A system according to clause 6 wherein the edge detector is positioned at an angle of around 5 degrees away from an axis extending perpendicular to the direction of the conveying path.

8. A system according to clauses 3 to 7 wherein the edge detector includes a separate receiver for receiving light emitted from the emitter, said receiver being positionable on an opposing side of the conveying path to the emitter, and optionally wherein the receiver is positionable such that an axis drawn through the emitter and the receiver is angularly offset with respect to the axis perpendicular to the direction of the conveying path.

9. A system according to clauses 3 to 7 wherein the edge detector includes a receiver which is configured to receive a continuous light beam or pulses of light which are emitted from the emitter and reflected from a surface.

10. A system according to clause 9 wherein the receiver is integrated in the same device as the emitter.

11. A system according to clauses 2 to 10 wherein the edge detector is configured to detect a front edge of a package.

12. A system according to any of the preceding clauses wherein the distance from the reference point to the package is detected with either the edge detector according to claims 2 to 11 or a separate distance detector.

13. A system according to clause 12 wherein the sensor system includes a separate distance detector having an emitter and a receiver, where the emitter is configured to emit a continuous light or ultrasonic beam, which is reflectable from a surface of the package and receivable by the receiver, and/or wherein the distance is measured from the reference point to the package is along an axis that is substantially perpendicular to the direction of the conveying path, and/or wherein the reference point is the point at which the emitter emits light.

14. A system according to any of the preceding clauses wherein the speed detection includes a first and a second device spaced a predetermined distance apart, so that the time taken for a package to pass from the first to the second device can be measured.

15. A system according to clause 14 wherein the first device includes an emitter and a corresponding receiver and the second device includes an emitter and a corresponding receiver, wherein each emitter is configured to emit a light or ultrasonic beam and each receiver is configured to receive the light or ultrasonic beam emitted by its respective emitter.

16. A system according to clause 14 or 15 wherein the first or second device is either the edge detector according to clause 2 to 11 or the distance detector according to clause 12.

17. A system according to clause 16 wherein the other of the first or second device is the other of the distance detector according to clause 12 or 13 or the edge detector according to clause 2 to 11.

18. A system according to any of the preceding clauses wherein the sensor system receives data relating to a speed of a conveyor upon which the package is travelling, and/or wherein the system further includes a conveyor for transporting the item from a first location to a second location along the conveying path.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

What is claimed is:

1. A label application system for applying a label to a package travelling on a conveyor along a conveying path including:

an applicator apparatus which is operable to move the label into contact with the package, a control system, which controls operation of the applicator apparatus, and a sensor system operable to detect an edge of the package, a distance from a reference point to the package, and a speed at which the package is travelling, wherein the sensor system includes an edge detector including an emitter which is angularly offset from an axis extending perpendicular to a direction of travel along the conveying path and towards the direction of travel along the conveying path, and wherein the control system is operable to receive and process data from the sensor system relating to the package and initiate operation of the applicator apparatus such that the label is applied to the package in a desired position as the package moves in the direction of travel along the conveying path.

2. A system according to claim 1 wherein the edge detector is positioned at an angle of between 2 and 8 degrees away from the axis extending perpendicular to the direction of travel along the conveying path.

3. A system according to claim 1 wherein the emitter is configured to emit a continuous light beam or pulses of light at a predetermined frequency.

4. A system according to claim 3 wherein the continuous light beam is, or the pulses of light are, emitted from the emitter and reflected from a surface.

5. A system according to claim 2 wherein the edge detector is positioned at an angle of around 5 degrees.

6. A system according to claim 1 wherein the sensor system includes a separate distance detector having an emitter and a receiver, where the emitter of the separate distance detector is configured to emit a continuous light or ultrasonic beam, which is reflectable from a surface of the package and receivable by the receiver.

7. A system according to claim 6 wherein the distance measured from the reference point to the package is along an axis that is substantially perpendicular to the direction of travel along the conveying path.

8. A system according to claim 1 wherein the sensor system includes a speed detector, which includes a first device and a second device spaced a predetermined distance apart, so that the time taken for the package to pass from the first device to the second device can be measured.

9. A system according to claim 8 wherein the first device or second device is the edge detector.

10. A system according to claim 1 wherein the sensor system is housed within a single sensor module or housing.

11. A label application system for applying a label to a package travelling on a conveyor along a conveying path including:

an applicator apparatus configured to move the label into contact with the package, a control system, which controls operation of the applicator apparatus, and a sensor system configured to detect an edge of the package, a distance from a reference point to the package, and a speed at which the package is travelling, wherein the control system is configured to receive and process data relating to the package from the sensor system to determine a current position of the package, determine an application position of the package and a time at which the package will be at the application position, determine an application cycle time required for the applicator apparatus to move to the application position, determine or adjust one or more parameters relating to an application cycle of the applicator apparatus to place the applicator apparatus at an angle that complements a non-straight angular positioning of the package, and determine when to initiate operation of the applicator apparatus, using the time at which the package will be at the application position and the application cycle time, such that the label is applied to the package as the package moves in a direction of travel along the conveying path.

12. A label application system according to claim 11 wherein the control system is configured to begin a trigger cycle of determining when to initiate operation of the applicator apparatus when a front edge of the package is detected.

13. A label application system according to claim 11 wherein the control system is configured to determine or adjust the one or more parameters relating to the application cycle of the applicator apparatus in real time.

14. A label application system according to claim 13 wherein the control system is configured to alter an angle of the applicator apparatus such that the label is applied to the package at an ideal angle.

15. A label application system for applying a label to a package travelling on a conveyor along a conveying path including:

an applicator apparatus which is operable to move the label into contact with the package, a sensor system being operable to detect an edge of the package, a distance from a reference point to the package, and a speed at which the package is travelling, the sensor system having a sensor housing, including more than one detector inside the sensor housing and configured to detect different characteristics of the package, which is positionable in a known location, and a control system, which controls operation of the applicator apparatus, and is operable to receive and process data from the sensor system relating to the package and initiate operation of the applicator apparatus such that the label is applied to the package in a desired position as the package moves in a direction of travel along the conveying path.

16. A label application system according to claim 15 wherein the speed detection includes a first device and a second device spaced a predetermined distance apart and wherein both the first device and the second device are edge detectors positioned approximately 120 mm apart.

17. A label application system according to claim 15 wherein the sensor housing is held or supported in a single location relative to the applicator apparatus.

18. A system according to claim 10 wherein the single sensor module or housing is held or supported in a single location relative to the applicator apparatus.

19. A label application system according to claim 15 wherein the sensor housing is positioned upstream of the applicator apparatus.

20. A label application system according to claim 15 wherein the sensor system includes three detectors which are housed in the sensor housing.

* * * * *